(12) United States Patent
Tsuda (10) Patent No.: US 10,216,270 B2
(45) Date of Patent: Feb. 26, 2019

(54) SIGH LINE INPUT APPARATUS (71) Applicant: DENSO CORPORATION, Kariya, Aichi-pref (JP)

(72) Inventor: Yoshiyuki Tsuda, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 11 days.

(21) Appl. No.: 15/314,128

(22) PCT Filed: Jun. 8, 2015

(86) PCT No.: PCT/JP2015/002861
§ 371 (c)(1),
(2) Date: Nov. 28, 2016

(87) PCT Pub. No.: WO2015/194123
PCT Pub. Date: Dec. 23, 2015

(65) Prior Publication Data
US 2017/0212584 A1    Jul. 27, 2017

(30) Foreign Application Priority Data

Jun. 20, 2014 (JP) ................................ 2014-127319

(51) Int. Cl.
*G09G 5/00* (2006.01)
*G06F 3/01* (2006.01)
(Continued)

(52) U.S. Cl.
CPC .............. *G06F 3/013* (2013.01); *B60K 35/00* (2013.01); *B60K 37/06* (2013.01);
(Continued)

(58) Field of Classification Search
CPC .......... G02B 2027/014; G02B 27/0093; G02B 2027/0138; G02B 27/0172
See application file for complete search history.

(56) References Cited

U.S. PATENT DOCUMENTS 6,750,832 B1 * 6/2004 Kleinschmidt ........ B60K 35/00
345/7
2012/0185805 A1 * 7/2012 Louch .................. G06F 3/04812
715/862
(Continued)

FOREIGN PATENT DOCUMENTS

JP        H6321011 A     11/1994
JP        2000250699 A    9/2000
(Continued)

*Primary Examiner* — Nan-Ying Yang
(74) *Attorney, Agent, or Firm* — Harness, Dickey & Pierce, P.L.C.

(57) ABSTRACT

A sight line input apparatus includes: a display portion that displays an input item at a position where the input item is viewable from a driver seat; a setup portion that sets a virtual input region at a position displaced from a display region of the display portion toward a driving visual field of the driver, the virtual input region being associated with the input item; a detection portion that detects a sight line position of a driver; and an input controller that performs an input process in accordance with the input item associated with the virtual input region, when the sight line position is in the virtual input region set by the setup portion. When a predetermined operation of the driver is detected, the setup portion changes the virtual input region into a mode that permits the driver to gaze at the virtual input region with ease.

15 Claims, 8 Drawing Sheets

(51) Int. Cl.
  *G06F 3/0487* (2013.01)
  *G02B 27/01* (2006.01)
  *G06F 3/0481* (2013.01)
  *G02B 27/00* (2006.01)
  *B60K 35/00* (2006.01)
  *G06F 3/0484* (2013.01)
  *B60K 37/06* (2006.01)
(52) U.S. Cl.
  CPC ......... *G02B 27/0093* (2013.01); *G02B 27/01* (2013.01); *G02B 27/0101* (2013.01); *G06F 3/0481* (2013.01); *G06F 3/0487* (2013.01); *G06F 3/04845* (2013.01); *B60K 2350/901* (2013.01); *B60K 2350/96* (2013.01); *B60K 2350/962* (2013.01); *B60K 2350/965* (2013.01); *G02B 2027/014* (2013.01); *G02B 2027/0141* (2013.01)

(56) References Cited

U.S. PATENT DOCUMENTS

| | | | |
|---|---|---|---|
| 2012/0200490 A1 | 8/2012 | Inada | |
| 2013/0307771 A1* | 11/2013 | Parker | G06F 3/013 345/158 |
| 2014/0247208 A1* | 9/2014 | Henderek | G06F 3/0481 345/156 |

FOREIGN PATENT DOCUMENTS

| | | |
|---|---|---|
| JP | 2008195142 A | 8/2008 |
| JP | 2009113710 A | 5/2009 |
| JP | 2009292296 A | 12/2009 |
| JP | 2010221960 A | 10/2010 |
| JP | 2012014217 A | 1/2012 |
| JP | 2012056359 A | 3/2012 |
| JP | 2012164012 A | 8/2012 |

\* cited by examiner

SIGH LINE INPUT APPARATUS

CROSS REFERENCE TO RELATED APPLICATIONS

This application is a U.S. National Phase Application under 35 U.S.C. 371 of International Application No. PCT/JP2015/002861 filed on Jun. 8, 2015 and published in Japanese as WO 2015/194123 A1 on Dec. 23, 2015. This application is based on and claims the benefit of priority from Japanese Patent Application No. 2014-127319 filed on Jun. 20, 2014. The entire disclosures of all of the above applications are incorporated herein by reference.

TECHNICAL FIELD

The present disclosure relates to sight line input apparatus mounted in a vehicle.

BACKGROUND ART

There is a conventionally-proposed technique for detecting a sight line position at which a person gazes and inputting, for example, an operating instruction for an electronic device on the basis of the detected sight line position. A technique disclosed, for instance, in Patent Literature 1 improves the operability and dependability of sight line input by setting a sight line input instruction portion in such a manner as to include an outer region of a displayed image indicative of an input item.

The inventor of the present application has found the following findings. When sight line input is to be applied to a display device installed, for instance, on an instrument panel or center console of an automobile, a significant burden is placed on a driver of the automobile since the driver has to look away from a driving visual field and gaze at a screen targeted for operation. Meanwhile, the technique described in Patent Literature 1 improves the operability and dependability by increasing the size of the input instruction portion. However, the technique is not adequate for solving the above difficulty since it still requires the driver to look away from the driving visual field and gaze at a displayed image.

PRIOR ART LITERATURE

Patent Literature

Patent Literature 1: JP 2000-250699 A

SUMMARY OF INVENTION

It is an object of the present disclosure is to provide a technique that reduces the operating burden on a driver of a vehicle during the use of sight line input apparatus mounted in the vehicle.

A sight line input apparatus according to the present disclosure includes a display portion, a setup portion, a detection portion, and an input controller. The display portion displays an input item at a position where the input item is viewable from a driver seat, the input item being to be specified by a driver of a vehicle. The setup portion sets a virtual input region at a position displaced from a display region of the display portion toward a driving visual field of the driver, the virtual input region being associated with the input item displayed on the display portion. The detection portion detects a sight line position of the driver. The input controller performs an input process in accordance with the input item associated with the virtual input region, when the sight line position detected by the detection portion is in the virtual input region set by the setup portion. On condition that a predetermined operation by the driver is detected, the setup portion changes the virtual input region into a mode that permits the driver to gaze at the virtual input region with ease.

According to the present disclosure, the virtual input region for an input item displayed on the display portion can be set at a position that is displaced from the display region of the display portion toward the driving visual field. Therefore, the driver can perform sight line input without looking straight at the screen of a display device. It is possible to reduce the amount of sight line shift from the driving visual field, thereby reducing the operating burden on the driver. Additionally, the operating burden on the driver can be further reduced by changing the virtual input region in such a manner that it is easily gazed at by the driver on condition that a predetermined operation performed by the driver is detected.

BRIEF DESCRIPTION OF DRAWINGS

The above and other aspects, features and advantages of the present disclosure will become more apparent from the following detailed description made with reference to the accompanying drawings. In the drawings.

EMBODIMENTS FOR EXPLOITATION OF INVENTION

Hereinafter, a preferred embodiment will be described with reference to the drawings.

(Description of Configuration of Sight Line Input System)

Figure 1:
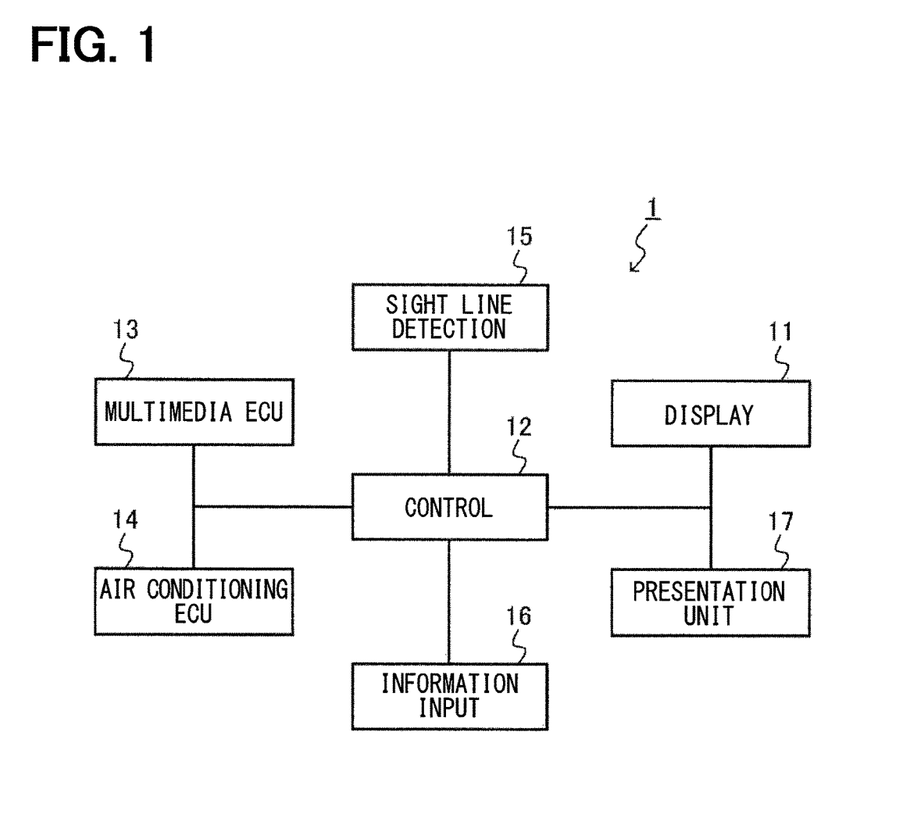
FIG. 1 is a block diagram illustrating an outline configuration of a sight line input system.

According to the embodiment of the present disclosure, a sight line input system 1 includes a center display 11, a controller 12, a multimedia ECU 13, an air conditioning ECU 14, a sight line detection portion 15, a vehicle information input portion 16, and a presentation unit 17, as illustrated in FIG. 1. The sight line input system 1 corresponds to sight line input apparatus of the present disclosure. The center display 11 corresponds to a display portion. The controller 12 corresponds to a setup portion, an input controller, and a presentation portion. The sight line detection portion 15 corresponds to a detection portion.

The center display 11 is a display device disposed on a center console that is positioned midway between the driver seat portion and the front passenger seat portion of a dashboard, which is disposed in front of a driver seat in the interior of an automobile. The center display 11 is implemented by, for example, a color display device having a display surface of a liquid crystal display. The center display 11 displays an image indicative of information transmitted, for example, from the multimedia ECU 13 and the air conditioning ECU 14. In compliance with a display control signal outputted from the controller 12, the center display 11 displays an operating screen that shows a GUI (Graphical User Interface) image for issuing operating instructions to the multimedia ECU 13 and the air conditioning ECU 14. The GUI image is text and graphic information including, for example, icons and switches to which various hardware operating functions are assigned and various symbol marks.

The controller 12 is mainly formed of a known microcomputer that includes a CPU, a ROM, a RAM, an I/O, and a bus line connecting these components (all of these elements are not shown). The controller 12 is connected through a communication network built in the vehicle to the center display 11, the multimedia ECU 13, the air conditioning ECU 14, the sight line detection portion 15, the vehicle information input portion 16, and the presentation unit 17.

In compliance with a program stored, for example, in the ROM, the controller 12 displays various operating screens on the center display 11. The operating screens are generated by applications running in the multimedia ECU 13 or the air conditioning ECU 14. Then, based on the sight line position of a driver, which is detected by the sight line detection portion 15, the controller 12 performs a sight line (eye-gaze) input process of inputting an operating instruction assigned to an icon on an operating screen. In such an instance, based on an operation performed by the driver, the controller 12 sets a virtual input region that is displaced from the display surface of the center display 11, and enables the virtual input region to receive a sight line input relative to the operating screen displayed on the center display 11. The sight line input process will be described in detail later.

The multimedia ECU 13 is an onboard electronic controller that controls applications for information systems such as a navigation system, an audio system, a television, a radio, and a hands-free telephone function. The air conditioning ECU 14 is an onboard electronic controller that controls an air conditioner mounted in the vehicle.

It is assumed that the sight line input system 1 according to the present embodiment performs sight line input in order, for example, to adjust the volume of audio or switch to the next song, change the channel of a radio or television, make a hands-free response to an incoming phone call, or adjust the temperature or air flow of the air conditioner as operation target. These operating targets can be handled with ease, and an erroneous operation of the operating targets does not affect the traveling status of the vehicle.

The sight line detection portion 15 receives an image of the driver that is captured by a camera (not shown) adapted to capture the image of a face of the driver, and analyzes the received image to detect the sight line position of the driver. The method of detecting the sight line position is publicly known and will not be described in detail here. The vehicle information input portion 16 acquires signals indicative of the status of various components of the vehicle from sensors (not shown) that detect the status of the components (for example, a vehicle speed, an accelerator opening, a steering angle, and a gearshift position), and inputs the acquired signals to the controller 12. The presentation unit 17 is an actuator that presents information to the driver. More specifically, the presentation unit is implemented, for example, by a vibration device (not shown) built in a steering wheel of the vehicle.

(Description of Sight Line Input Process)

The sight line input process performed by the controller 12 will be described with reference to the flowchart of FIG. 2. The sight line input process is performed while an operating screen is displayed on the center display 11 on the basis of display control exercised by the ECUs 13, 14.

In S100, the controller 12 measures the sight line position of the driver on the basis of the result of detection by the sight line detection portion 15. In S102, the controller 12 acquires vehicle information indicative of the vehicle speed, the accelerator opening, and the gearshift position through the vehicle information input portion 16.

Figure 4A:
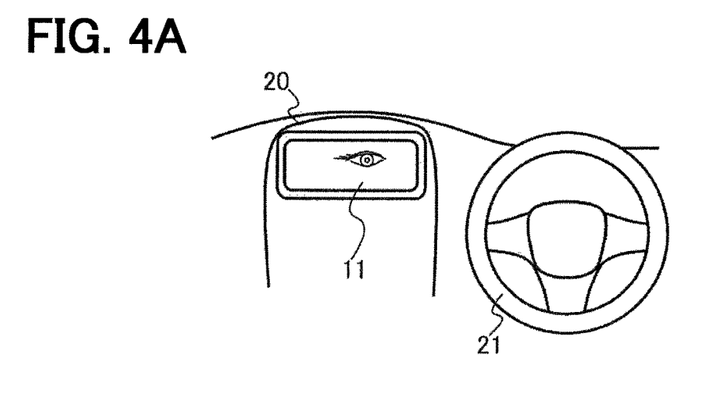
FIG. 4A is a diagram illustrating an outline of sight line input based on a virtual input region.

Next, in S104, the controller 12 determines, based on the sight line position measured in S100 and on the vehicle information acquired in S102, whether a particular operation performed by the driver is observed. As illustrated in FIG. 4A, the particular operation corresponds to an operation performed by the driver to look at the operating screen of the center display 11, that is, an operation in which the sight line position of the driver is a position on the display surface of the center display 11. The particular operation also corresponds to a driving operation performed by the driver to move the vehicle. A specific example of the driving operation performed by the driver to move the vehicle is a situation where the vehicle speed is not 0 (zero), the accelerator is on, and the drive range (D) is selected as the gearshift position. In S104, the controller 12 may make an affirmative determination when a plurality of particular operations are observed or when a certain operation is observed.

Figure 2:
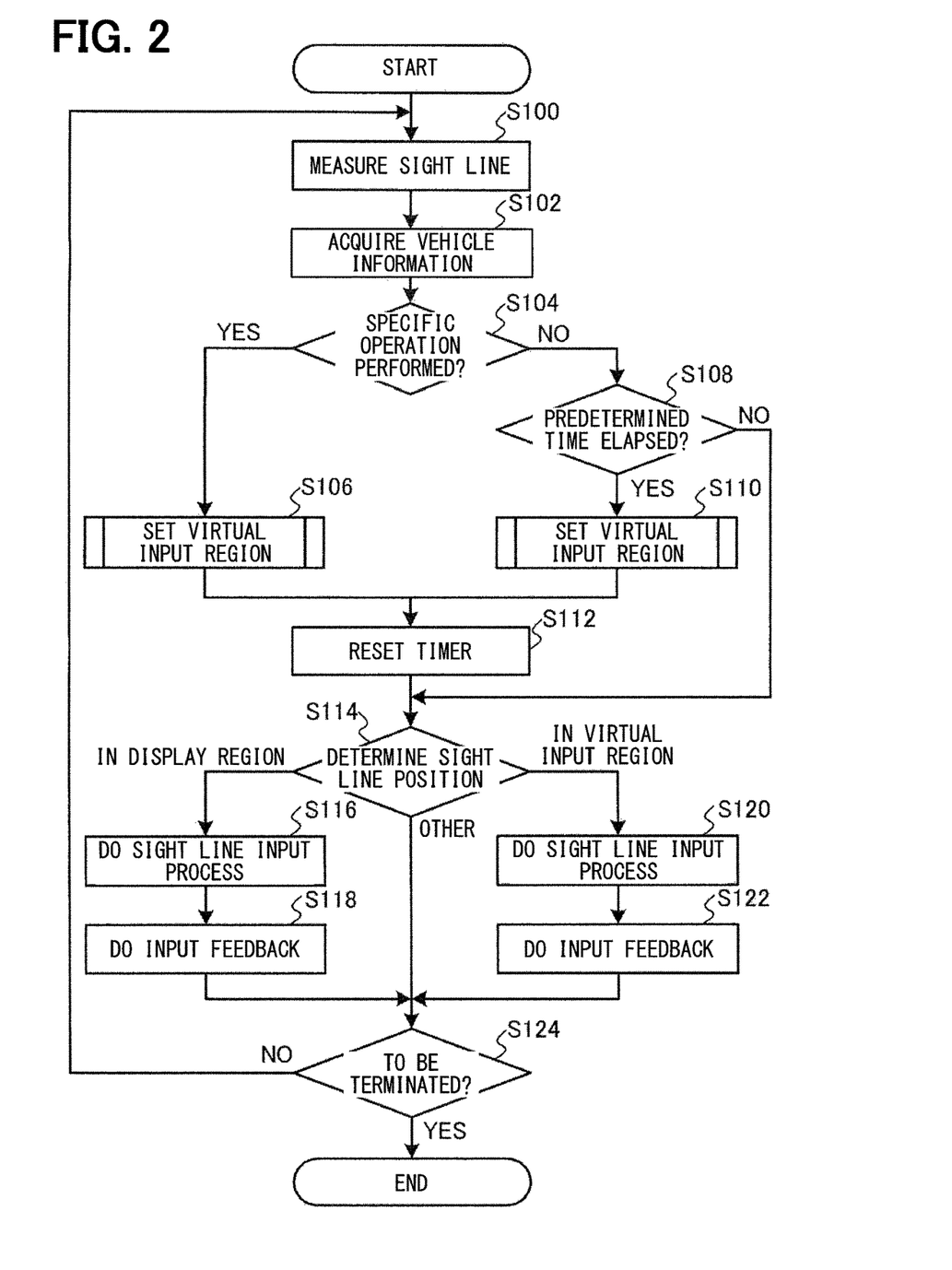
FIG. 2 is a flowchart illustrating a sight line input process.

Returning to the flowchart of FIG. 2, when a particular operation performed by the driver is observed in S104 (S104: YES), the controller 12 proceeds to S106. In S106, the controller 12 sets a virtual sight line input region that relates to an input item indicated by a GUI image on the operating screen displayed on the center display 11 (virtual input region setup process). Here, the virtual input region is set in such a manner as to provide increased ease of sight line input.

Figure 4B:
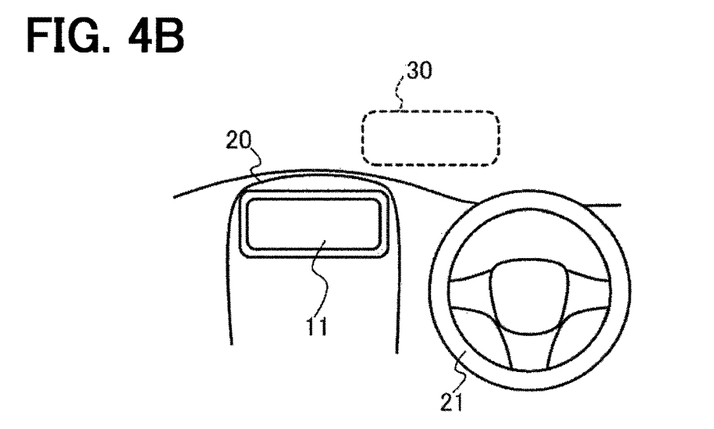
FIG. 4B is a diagram illustrating an outline of sight line input based on the virtual input region.

More specifically, when the virtual input region is not activated at that time point, a virtual input region 30 is newly set in a space that is displaced from the operating screen toward a driving visual field as illustrated in FIG. 4B. If, by contrast, the virtual input region is currently activated, its position and size are gradually changed so as to provide higher ease of sight line input than a formerly set virtual input region. For example, the virtual input region is moved close to a reference sight line position 100 of the driver or enlarged. This virtual input region setup process will be described in detail later. The driving visual field is a visual field obtained when, for instance, the driver drives the vehicle. It also corresponds to a visual field for the outside of the vehicle that is obtained when the driver drives the vehicle.

When, by contrast, no particular operation performed by the driver is observed in S104 (S104: NO), the controller 12 proceeds to S108. In S108, based on the count of a timer that measures the time remaining before the ease of sight line input through the virtual input region is decreased, the controller 12 determines whether a predetermined period of time has elapsed. When the predetermined period of time has not elapsed (S108: NO), the controller 12 proceeds to S114. When, by contrast, the predetermined period of time has elapsed (S108: YES), the controller 12 proceeds to S110.

In S110, the virtual input region setup process is performed to decrease the ease of sight line input through the virtual input region. More specifically, a process of gradually decreasing the ease of sight line input is performed by changing a setting for the currently activated virtual input region. For example, the virtual input region is moved away from the reference sight line position 100 of the driver or the range of the virtual input region is contracted. Further, the controller 12 gradually decreases the ease of sight line input through the virtual input region. Eventually, the controller 12 erases the virtual input region.

Next, in S112, the controller 12 resets the count of the timer. Then, in S114, the controller 12 determines, based on the result of detection by the sight line detection portion 15, the positional relationship between the sight line position of the driver, the display surface of the center display 11, and the currently activated virtual input region. When the sight line position of the driver is within the range of the display surface of the center display 11 (S114: IN DISPLAY REGION), the controller 12 proceeds to S116.

In S116, the sight line input process for a case where the driver is looking straight at the center display 11 is performed. More specifically, the controller 12 transmits, to the associated ECUs 13, 14, an instruction for selecting or applying an input item indicated by a GUI image that is displayed on the operating screen on the center display 11 and disposed at a position corresponding to the sight line position of the driver. Next, in S118, the controller 12 causes the operating screen of the center display 11 to display an image representative of a feedback to a selection instruction issued from the operating screen in S116.

Figure 4C:
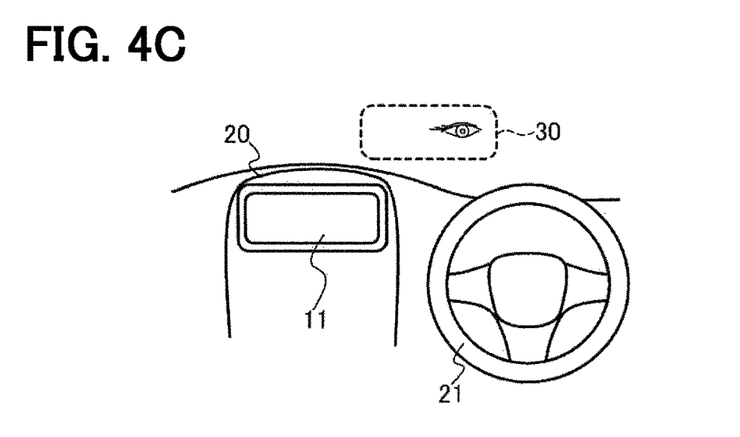
FIG. 4C is a diagram illustrating an outline of sight line input based on the virtual input region.

When, by contrast, the sight line position of the driver is determined to be in the virtual input region (S114: IN VIRTUAL INPUT REGION) as illustrated in FIG. 4C, the controller 12 proceeds to S120. In S120, the controller 12 performs the sight line input process for a case where the driver is not looking straight at the center display 11. The controller 12 receives a sight line input through the virtual input region. More specifically, the controller 12 transmits, to the associated ECUs 13, 14, an instruction for selecting or applying the function of an input item that is in the virtual input region and associated with a position corresponding to the sight line position of the driver.

Next, in S122, the controller 12 performs an operation representative of a feedback to a selection instruction issued from the virtual input region in S120. More specifically, information indicative of the sight line position detected in the virtual input region is presented to the driver by means, for example, of display or vibration. The method of presentation will be described in detail later. Meanwhile, when the sight line position of the driver is determined in S114 to be outside the range of the display surface of the center display 11 and outside the virtual input region (S114: OTHER), the controller 12 proceeds to S124.

In S124, the controller 12 determines whether or not to terminate the sight line input process. When the sight line input process is not to terminate (S124: NO), the controller 12 returns to S100. If, by contrast, an instruction for terminating the sight line input process is inputted (S124: YES), the controller 12 terminates the sight line input process.

(Description of Virtual Input Region Setup Process)

Figure 3:
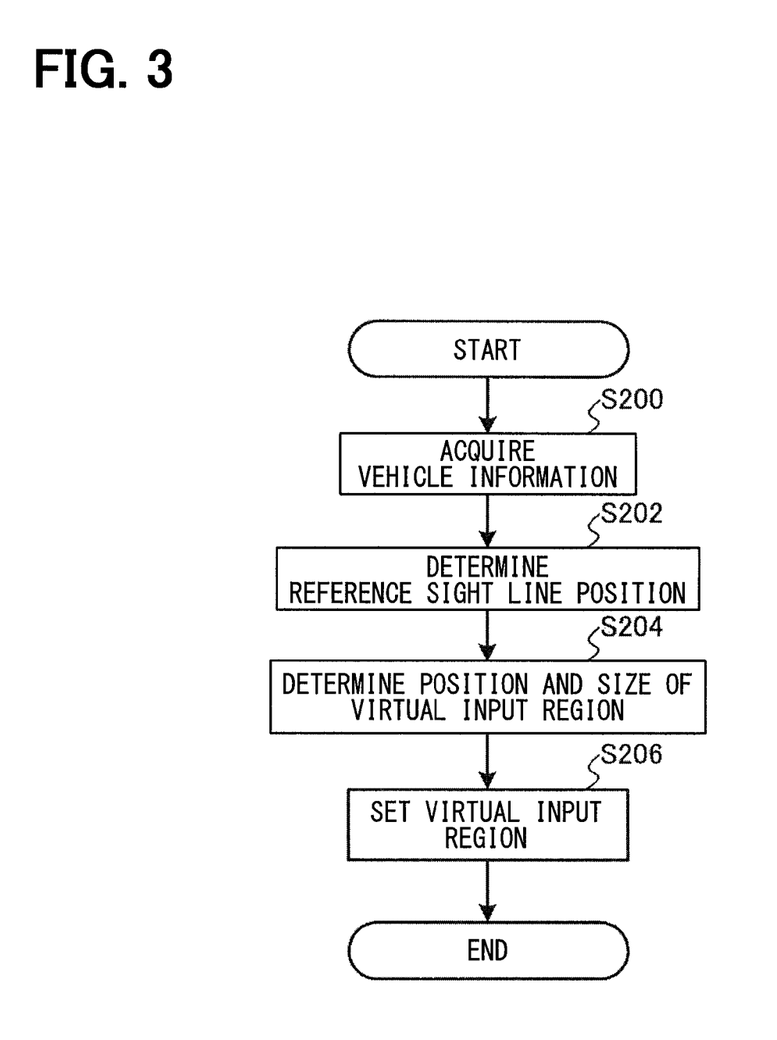
FIG. 3 is a flowchart illustrating a virtual input region setup process.

The virtual input region setup process performed by the controller 12 will be described with reference to the flowchart of FIG. 3. This process is performed in S106 and S110 of the sight line input process (see FIG. 2).

In S200, the controller 12 acquires vehicle information indicative of the vehicle speed and steering angle through the vehicle information input portion 16. In S202, the controller 12 determines the reference sight line position 100, which is a reference for determining the position of the virtual input region. The reference sight line position 100 is a reference position in the driving visual field that is assumed to be most frequently gazed at by the driver.

The reference sight line position 100 may be always determined to be a particular position in front of the driver seat or may be determined to vary with the traveling status of the vehicle. For example, the reference sight line position 100 may vary with the steering angle. More specifically, when the vehicle moves straight, the reference sight line position 100 may be set in front of the driver seat. When, by contrast, the vehicle makes a left or right turn, the reference sight line position 100 may be shifted toward a direction in which the vehicle turns.

Figure 5A:
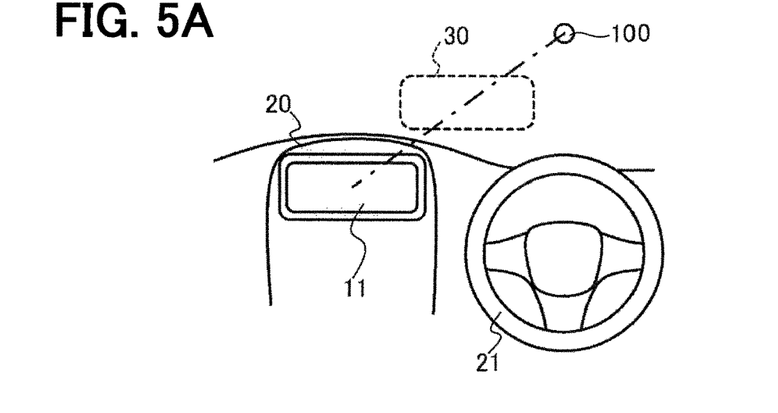
FIG. 5A is a diagram illustrating an exemplary layout of the virtual input region.

Next, in S204, the controller 12 determines the position and size of the virtual input region on the basis, for instance, of the reference sight line position 100 determined in S202 and of the vehicle speed. The virtual input region 30 may be set at a predetermined position on a virtual line connecting the display surface of the center display 11 to the reference sight line position 100, as illustrated in FIG. 5A.

Figure 5B:
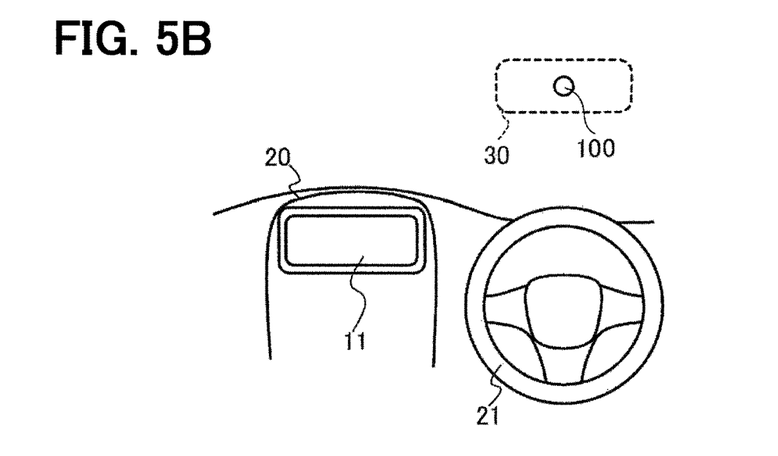
FIG. 5B is a diagram illustrating an exemplary layout of the virtual input region.

Alternatively, the virtual input region 30 may be positioned so that it includes the reference sight line position 100 as illustrated in FIG. 5B. The size of the virtual input region may be set to a fixed value or changeable from a reference value to a value appropriate for the situation. The shape of the virtual input region may be similar, for instance, to the shape of the display surface of the center display 11.

Figure 5C:
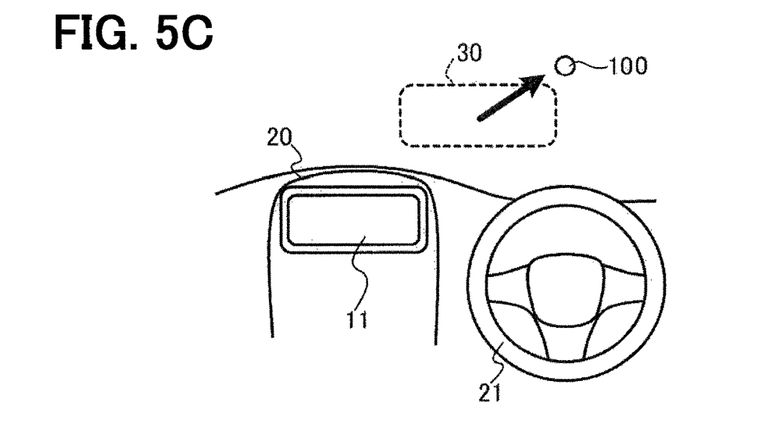
FIG. 5C is a diagram illustrating an exemplary layout of the virtual input region.

Control exercised to determine the position and size of the virtual input region varies as described below depending on whether the ease of sight line input is to be increased (S106) or decreased (S110). If, in S106, the virtual input region is to be set so as to increase the ease of sight line input, the virtual input region is moved closer to the reference sight line position 100 or the range of the virtual input region is increased, as illustrated in FIG. 5C. In short, the virtual input region is moved or enlarged in the example of FIG. 5C. In this instance, the degree by which the virtual input region is moved close to the reference sight line position 100 and the degree by which the virtual sight line region is enlarged may be changed based on the vehicle speed. More specifically, when the vehicle speed is relatively high, the ease of sight line input is further increased by further moving the virtual input region close to the reference sight line position 100 or by further enlarging the virtual sight line region.

Meanwhile, if, in S110, the ease of sight line input through the virtual input region is to be decreased, the virtual input region is moved away from the reference sight line position 100 or the size of the virtual input region is reduced. Returning to the flowchart of FIG. 3, in S206, the controller 12 activates the virtual input region on the basis of the position and size determined in S204. Here, the controller 12 assigns an input item included in the operating screen displayed on the center display 11 to an associated position in the virtual input region.

(Description of Virtual Input Region Functions)

Input items represented by GUI images shown on the operating screen displayed on the center display 11 are assigned to the virtual input region set in a space displaced from the display surface of the center display 11. In such an instance, all the input items on the operating screen displayed on the center display 11 may be assigned to the virtual input region. Alternatively, as illustrated in FIG. 6A, only some of the input items on the operating screen displayed on the center display 11 may be assigned to the virtual input region in order to increase the ease of sight line input through the virtual input region.

Figure 6A:
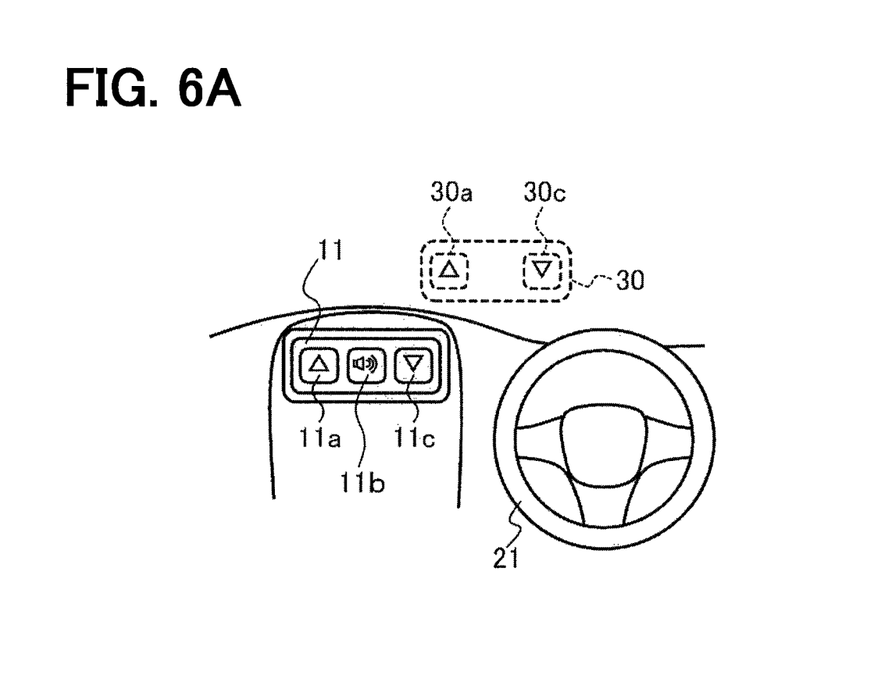
FIG. 6A is a diagram illustrating an exemplary function of the virtual input region.

The example of FIG. 6A assumes that input items represented by three icons 11a, 1b, 11c are displayed on the center display 11. For example, it is assumed that the icon 11a is a button for raising the volume of audio, and that the icon 11b is a button for changing the operating mode of audio, and further that the icon 11c is a button for lowering the volume of audio.

Meanwhile, it is assumed that only the input items 30a, 30c representative of the icons 11a, 11c displayed on the center display 11 are assigned to the virtual input region 30. That is to say, the input item representative of the icon 11b displayed on the center display 11 is eliminated from the virtual input region 30. It signifies that only the function of raising and lowering the volume of audio can be exercised.

Figure 6B:
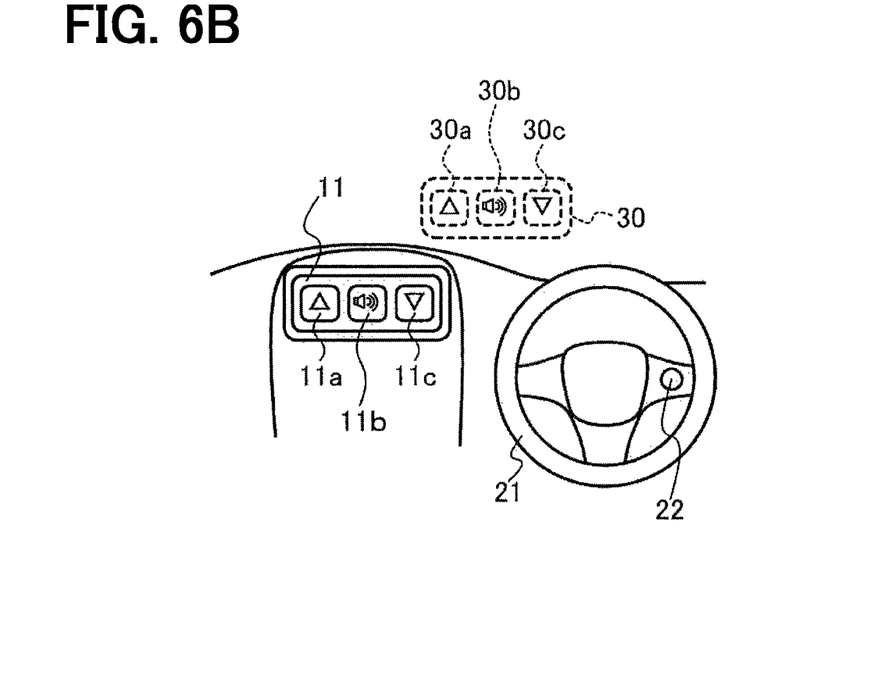
FIG. 6B is a diagram illustrating an exemplary function of the virtual input region.

Alternatively, as illustrated in FIG. 6B, an operation performed relative to an input item in the virtual input region may be restricted in order to prevent an erroneous sight line input operation from being performed through the virtual input region. More specifically, the operating screen on the center display 11 may permit two different operations to be performed. One operation is performed to select an input item representative of the icon 11a-11c, and the other operation is performed to execute the selected input item. Meanwhile, the virtual input region 30 may permit an operation to be performed only for the purpose of selecting an assigned input item 30a-30c. In this instance, an input item selected by sight line input through the virtual input region 30 may be executed by pressing a manual switch 22 mounted on the steering wheel 21.

(Description of Input Feedback to Virtual Input Region)

In S122 of the above-described sight line input process (referring to FIG. 2), the controller 12 presents, to the driver, information indicative of the sight line position detected in the virtual input region. Concrete examples of such presentation of information will be described with reference to FIGS. 7A, 7B, 8A, and 8B.

Figure 7A:
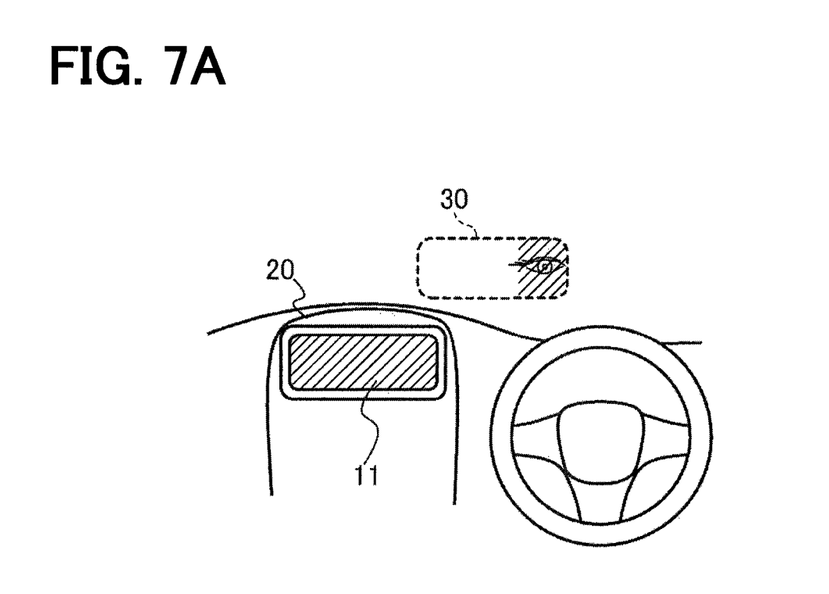
FIG. 7A is a diagram illustrating a feedback operation relative to sight line input based on the virtual input region.

The example of FIG. 7A deals with a case where the sight line position in the virtual input region 30 is indicated by the color of the entire screen of the center display 11. More specifically, it is assumed that the virtual input region 30 is divided into sub-regions, such as left, central, and right sub-regions, and that different colors are pre-assigned to the sub-regions. When the sight line position in the virtual input region 30 is detected, the controller 12 causes the center display 11 to display a color that is assigned to a sub-region corresponding to the detected sight line position. In such an instance, the color is preferably displayed on the entire screen so that the color displayed on the center display 11 can easily be recognized in a peripheral visual field of the driver.

Figure 7B:
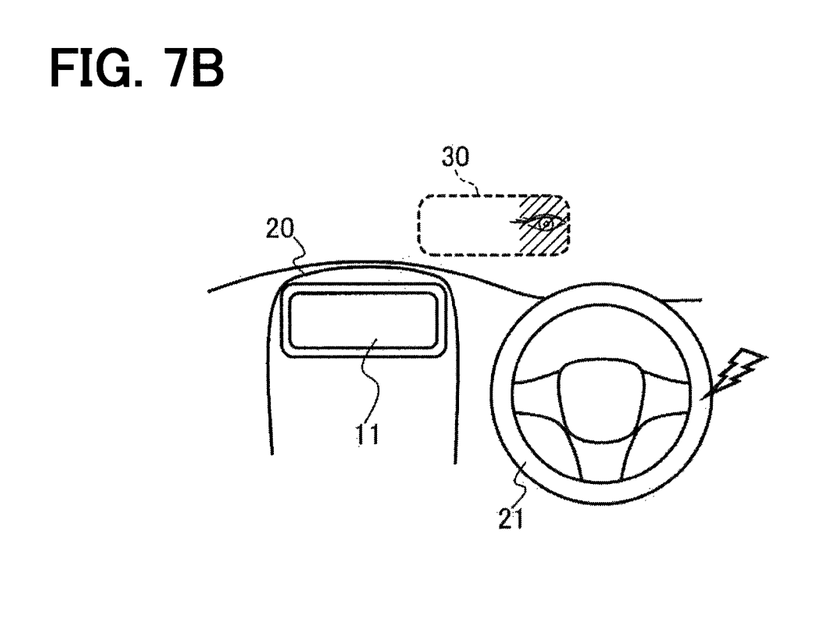
FIG. 7B is a diagram illustrating a feedback operation relative to sight line input based on the virtual input region.

The example of FIG. 7B deals with a case where the sight line position in the virtual input region 30 is indicated by a vibration generated by the vibration device (corresponding to an example of the presentation unit 17) built in a grip portion of the steering wheel 21. More specifically, it is assumed that the virtual input region 30 is divided into sub-regions, such as left, central, and right sub-regions. When the sight line position in the virtual input region 30 is detected, the controller 12 vibrates a portion of the steering wheel 21 that corresponds to a sub-region related to the detected sight line position. For example, when the sight line position is detected in the right sub-region of the virtual input region 30, the controller 12 vibrates only the right side of the steering wheel 21. When the sight line position is detected in the left sub-region of the virtual input region 30, the controller 12 vibrates only the left side of the steering wheel 21. When the sight line position is detected in the central sub-region of the virtual input region 30, the controller 12 vibrates both the left and right sides of the steering wheel 21.

Figure 8A:
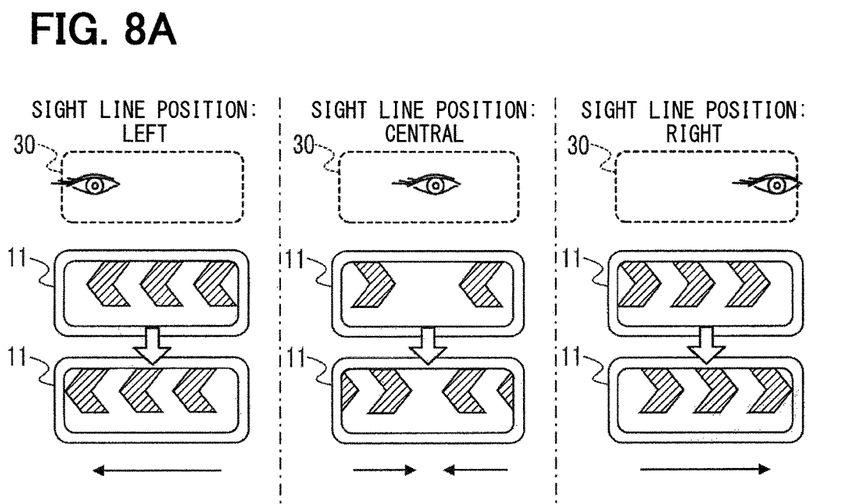
FIG. 8A is a diagram illustrating a feedback operation relative to sight line input based on the virtual input region.
Figure 8B:
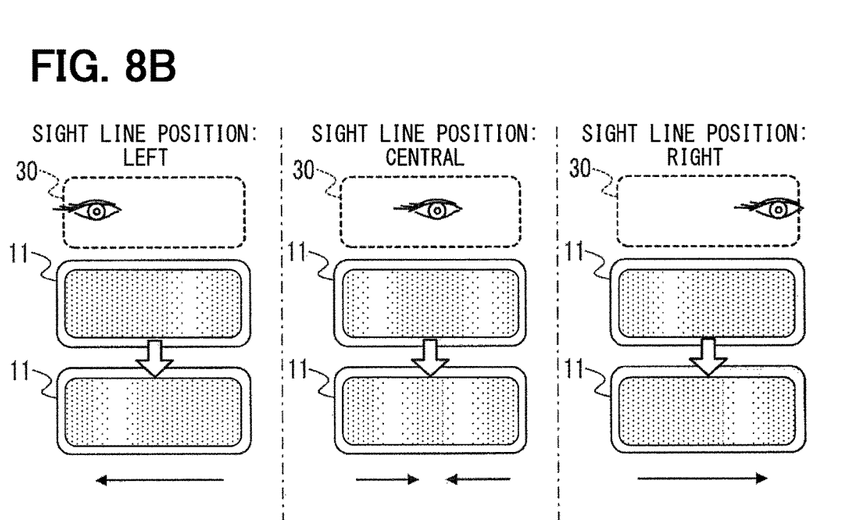
FIG. 8B is a diagram illustrating a feedback operation relative to sight line input based on the virtual input region.

The examples of FIGS. 8A and 8B deal with a case where the sight line position in the virtual input region 30 is indicated by a highlighted animation. More specifically, the controller 12 causes the center display 11 to display an animation in which a highlighted image moves toward a portion corresponding to the sight line position in the virtual input region 30.

In the example of FIG. 8A, when the sight line position is detected in the left sub-region of the virtual input region 30, the controller 12 causes the center display 11 to display an animation in which an arrow mark pattern moves from right to left. When the sight line position is detected in the central sub-region of the virtual input region 30, the controller 12 causes the center display 11 to display an animation in which an arrow mark pattern moves from the left and right sides to the center. When the sight line position is detected in the right sub-region of the virtual input region 30, the controller 12 causes the center display 11 to display an animation in which an arrow mark pattern moves from left to right.

Meanwhile, in the example of FIG. 8B, when the sight line position is detected in the left sub-region of the virtual input region 30, the controller 12 causes the center display 11 to display an animation in which a band-like pattern moves from right to left. When the sight line position is detected in the central sub-region of the virtual input region 30, the controller 12 causes the center display 11 to display an animation in which a band-like pattern moves from the left and right sides to the center. When the sight line position is detected in the right sub-region of the virtual input region 30, the controller 12 causes the center display 11 to display an animation in which a band-like pattern moves from left to right.

The virtual input region corresponding to the operating screen displayed on the center display 11 is set at a position that is displaced from the display surface of the center display 11 toward the driving visual field so that the virtual input region can receive a sight line input. This permits the driver to perform sight line input without looking straight at the screen of the center display 11, thereby reducing the operating burden on the driver.

Particularly, positioning the virtual input region on a virtual line connecting the display surface of the center display 11 to the reference sight line position 100 of the driver or positioning the virtual input region so as to include the reference sight line position 100 further reduces the burden placed on the driver who moves his or her sight line position in order to perform sight line input shift.

Further, increased ease of sight line input can be provided for the driver by allowing the driver to look at the center display 11 or perform a particular driving procedure in order to enlarge the virtual input region or move it close to the reference sight line position 100. Furthermore, sight line input can be facilitated in a flexible manner depending on the traveling status, such as the vehicle speed, by changing the degree by which the virtual input region is moved close to the reference sight line position 100 or enlarged.

Moreover, sight line input through the virtual input region can be facilitated by causing the center display 11 to display the sight line position detected in the virtual slight line region in an accentuated manner or by presenting the sight line position to the driver by vibrating the steering wheel 21.

It is noted that a flowchart or the processing of the flowchart in the present application includes multiple steps (also referred to as sections), each of which is represented, for instance, as S100. Further, each step can be divided into several sub-steps while several steps can be combined into a single step.

While various embodiments, configurations, and aspects of sight line input apparatus have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects according to the present disclosure.

The invention claimed is:

1. A sight line input apparatus comprising:
   a display portion that displays an input item at a position where the input item is viewable from a driver seat, the input item being specified by a driver of a vehicle;
   a setup portion that sets a virtual input region at a position displaced from a display region of the display portion toward a driving visual field of the driver, the virtual input region being associated with the input item displayed on the display portion and the virtual input region not being displayed;
   a detection portion that detects a sight line position of the driver; and
   an input controller that performs an input process in accordance with the input item associated with the virtual input region, when the sight line position detected by the detection portion is in the virtual input region set by the setup portion,
   wherein:
   on condition that a predetermined operation by the driver is detected, the setup portion changes the virtual input region into a mode that permits the driver to gaze at the virtual input region with ease; and
   the display portion is disposed in a center member of a dashboard located in front of the driver seat, the center member being located midway between the driver seat and a passenger seat.

2. The sight line input apparatus according to claim 1, wherein:
   as the predetermined operation, on condition that the sight line position detected by the detection portion is moved to a particular position, the setup portion changes the virtual input region into a mode that permits the driver to gaze at the virtual input region with ease.

3. The sight line input apparatus according to claim 1, further comprising:
   an operation information acquisition portion that acquires operation information on a driving operation performed with respect to the vehicle,
   wherein:
   as the predetermined operation, when a particular driving operation is performed in relation to the operation information, the setup portion changes the virtual input region into a mode that permits the driver to gaze at the virtual input region with ease.

4. The sight line input apparatus according to claim 1, wherein:
   The setup portion enlarges the virtual input region on condition that a predetermined operation performed by the driver is detected.

5. The sight line input apparatus according to claim 1, wherein:
   on condition that a predetermined operation performed by the driver is detected, the setup portion moves the virtual input region close to a reference sight line position that is set at a predetermined position in the driving visual field of the driver.

6. The sight line input apparatus according to claim 1, wherein:
   the setup portion positions the virtual input region on a virtual line connecting the display region of the display portion and the reference sight line position, which is set at a predetermined position in the driving visual field of the driver.

7. The sight line input apparatus according to claim 1, wherein:
   the setup portion positions the virtual input region at a position where the virtual input region includes the reference sight line position, which is set at a predetermined position in the driving visual field of the driver.

8. The sight line input apparatus according to claim 5, further comprising:
   a vehicle information acquisition portion that acquires vehicle information on a traveling status of the vehicle, wherein:
   the setup portion varies the reference sight line position in accordance with the traveling status indicated by the vehicle information.

9. The sight line input apparatus according to claim 1, further comprising:
   a vehicle information acquisition portion that acquires vehicle information on a traveling status of the vehicle, wherein:
   the setup portion varies, based on the traveling status indicated by the vehicle information, a degree by which the virtual input region is changed into a mode that permits the driver to gaze at the virtual input region with ease while the virtual input region is not displayed.

10. The sight line input apparatus according to claim 1, further comprising:
    a presentation portion that, when the sight line position of the driver is detected in the virtual input region, presents information on the sight line position of the driver.

11. The sight line input apparatus according to claim 1, further comprising:
    a feedback portion that, when the sight line position of the driver is detected in the virtual input region by the detection portion, provides a feedback indicative of detection of the sight line position in the virtual input region to the driver,
    wherein:
    the feedback includes a vibration generated in a steering wheel.

12. The sight line input apparatus according to claim 1, wherein the center member is a center console.

13. The sight line input apparatus according to claim 1, wherein the center member is a center panel.

14. The sight line input apparatus according to claim 1, wherein the display portion displays the input item right side up when the input item is viewed from the driver seat.

15. The sight line input apparatus according to claim 1, wherein an area in the virtual input region corresponds to an area in the display region of the display portion.

* * * * *

UNITED STATES PATENT AND TRADEMARK OFFICE
CERTIFICATE OF CORRECTION

PATENT NO. : 10,216,270 B2
APPLICATION NO. : 15/314128
DATED : February 26, 2019
INVENTOR(S) : Tsuda Page 1 of 1

It is certified that error appears in the above-identified patent and that said Letters Patent is hereby corrected as shown below:

On the Title Page

Column 1, (54), delete "SIGH" and insert --SIGHT-- therefor.

Signed and Sealed this
Twenty-first Day of May, 2019

Andrei Iancu
*Director of the United States Patent and Trademark Office*